(No Model.) 2 Sheets—Sheet 1.
W. E. PRALL.
BACK SUPPORT FOR BICYCLE SEATS.
No. 553,722. Patented Jan. 28, 1896.
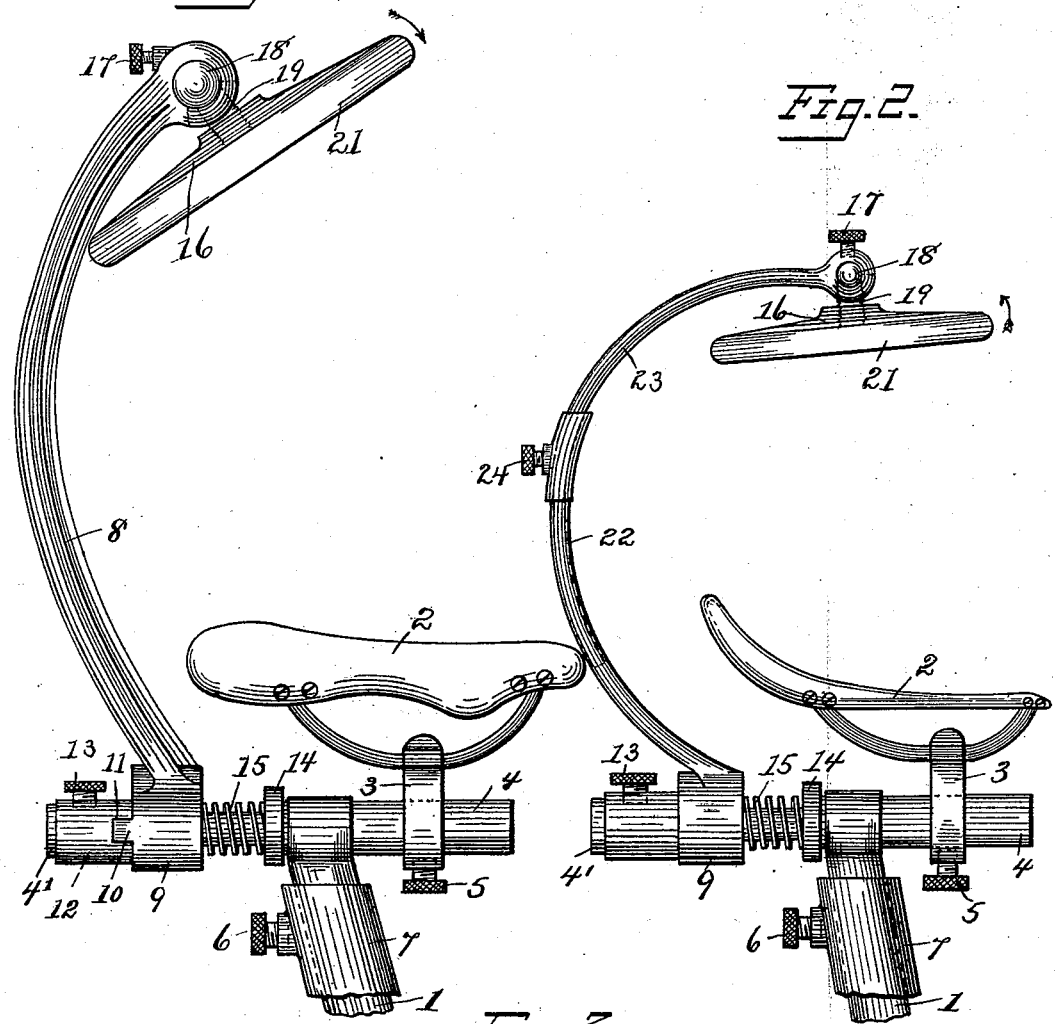
Witnesses
Albert Popkins
Frank D. Blackstone
Inventor
William E. Prall
by
Benj. R. Catlin
Attorney (No Model.) 2 Sheets—Sheet 2.
W. E. PRALL.
BACK SUPPORT FOR BICYCLE SEATS.
No. 553,722. Patented Jan. 28, 1896.
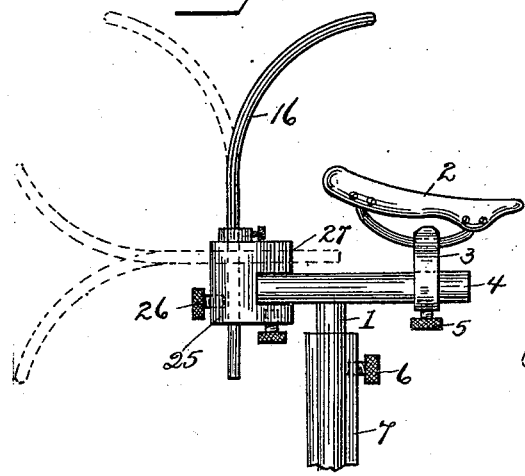
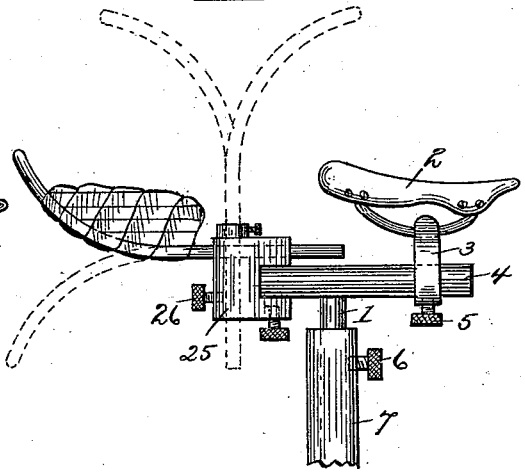
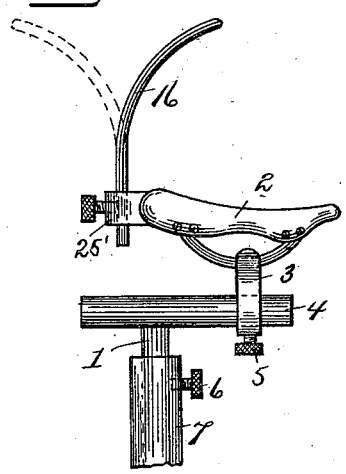
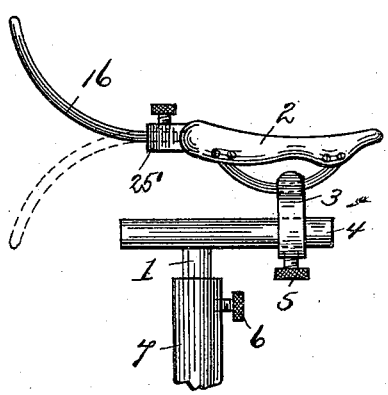
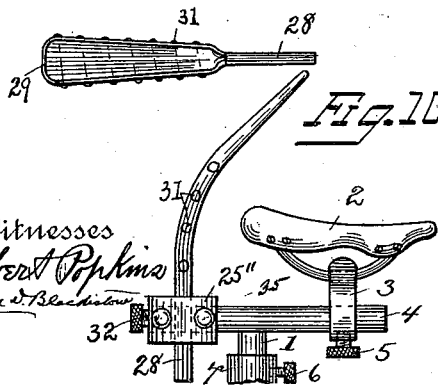
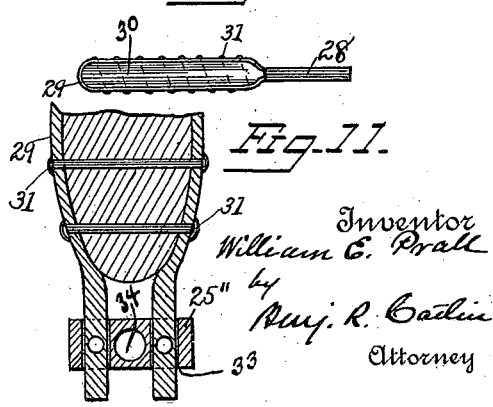
Witnesses
Albert Popkins
Frank D. Blackiston
Inventor
William E. Prall
by
Benj. R. Catlin
Attorney
ANDREW B. GRAHAM, PHOTO-LITHO, WASHINGTON, D.C.

UNITED STATES PATENT OFFICE.

WILLIAM EDGAR PRALL, OF WASHINGTON, DISTRICT OF COLUMBIA.

BACK-SUPPORT FOR BICYCLE-SEATS.

SPECIFICATION forming part of Letters Patent No. 553,722, dated January 28, 1896.

Application filed August 17, 1895. Serial No. 559,662. (No model.)

*To all whom it may concern:*

Be it known that I, WILLIAM EDGAR PRALL, a resident of Washington, District of Columbia, have invented certain new and useful Improvements in Back-Supports for Bicycle-Seats; and I do hereby declare the following to be a full, clear, and exact description of the invention, such as will enable others skilled in the art to which it pertains to make and use the same.

The invention relates to bicycle-seat back-supports, and has for its object to provide a back rest or support for the rider adapted among other uses to receive the back-thrust of his limbs and body when driving the bicycle at great speed and also to adapt such a support for use as a rest under ordinary conditions of moderate speed; and the invention consists in the construction hereinafter described and particularly pointed out.

In the accompanying drawings, Figure 1 is a side elevation of a bicycle-seat with the improvement applied thereto. Fig. 2 is a similar view showing modified details. Fig. 3 is a partial side elevation showing modification of another detail. Figs. 4 to 7, inclusive, are partial side elevations showing modified details. Figs. 8 and 9 are plans of modified back-supports. Fig. 10 is a side elevation showing modified means of securing a back-support, and Fig. 11 is an enlarged partial central transverse section through a back-support and its securing bracket-block.

Numeral 1 indicates the seat-post of a bicycle and 2 the seat. As shown the seat is supported from a ring or clamp 3 embracing and fastened to a bar or bracket-arm 4 rigidly connected to the seat-post.

5 indicates a set-screw for securing the seat-ring 3 to arms 4, and 6 a set-screw for securing the seat-post in the tubular member 7 of the frame. These parts may be of any approved form.

Upon the backward extension 4' of the seat-supporting arm 4 is rotatably held an arm or curved post 8 having a cylindrical socket ring or thimble 9 integral therewith and fitting the bar extension 4'. This socket is provided with a lug or lugs 10 adapted to be received and held in slots 11 in a clutch-ring 12 adjustably held on the bar extension 4' by a set-screw 13 or by other fastening device.

14 indicates a washer and 15 a coiled spring surrounding bar 4', the spring normally holding the tubular foot or socket 9 of the post 8 engaged with the clutch-ring 12.

16 denotes a rest or support of suitable form to fit the back of the rider. It is adjustably held in the top of the arm or post 8 by a clamping device, a set-screw 17 being indicated in the present instance. This screw bears on a pivot 18 rigidly attached to an arm 19 fixed to the main or upper part 16 of the back-support. The use of this screw or like device is optional, and in some cases the back-support will be made freely movable within fixed limits to provide for an automatic adjustment of the support to the body of the rider. 21 indicates the leather cover or padded face of said support.

The support 16 is adjustable in a vertical plane by means of its pivotal connection with the post 8.

The post or bar is preferably made of spring steel or like metal and curved as shown. It has such form and situation that the back-support overhangs the seat, and it is adapted to be firmly held at an angle of less than ninety degrees to the surface of the seat. The object of this inclination and of its overhanging situation is to place it in approximately direct opposition to the thrust of the rider's limbs upon the pedals of the machine.

In prior machines when they are driven at a high speed the weight of the rider is insufficient to resist the reflex action of this thrust and prevent the lifting of his body from the seat. By the improved support acting upon the back of the rider in a direction opposite to the thrust of his limbs he is enabled to more fully expend his strength upon the pedals instead of wasting a portion of it in lifting his weight from the seat.

To ease the action of the support upon the back it is preferred that its supporting post or bar should have some spring action. The spring, however, is preferably quite stiff and such as would be for that reason practically inoperative in an ordinary back-rest.

The back-support post is made movable, as by swinging in a vertical plane about its bar 4', in order that it may be moved out of the rider's way when he mounts the seat. As shown, this can be effected by compressing the spring 15 and unclutching the foot of the post 8, whereupon it can be turned out of the way of a person mounting the bicycle. Subsequently it can be swung into an operative position.

Neither the particular means of securing the parts above described, nor the particular form of the adjusting devices, or of the back-support post, or of the back-support, are essential, and these parts may be varied by mechanical skill. Neither is it essential that the back-rest be supported by the seat-post, nor that the back-rest be adapted to be moved from over the seat by swinging laterally with respect to the seat.

In Fig. 2 a form of post is shown which provides for adjusting the back-support to the use of riders under ordinary conditions of moderate speed, which means may also be employed to temporarily remove the overhanging support when the rider is mounting for swift riding. In this form the main part 22 of the back-rest post is made tubular to receive an adjustable part or member 23, and these parts are similarly curved, so that by simply pushing the upper member down into the lower the back-support is moved from the "racing" to the ordinary position. A set-screw 24 or other suitable clamping device provides for holding the parts in fixed relation when they have been adjusted as desired.

In Fig. 3 is indicated a means whereby the back-support can be thrown sidewise by the leg of the rider in dismounting. The lug 10' is made wedge-shaped and the slot or notch 11' of corresponding form to facilitate such operation. Obviously a transverse blow on the post 8 will rotate it out of the rider's way, the spring 15 being automatically compressed to permit the lug to escape from its notch.

In Fig. 4 is shown a construction by which a back-support 16 may be used strictly as such, or as an ordinary back-rest, or as a child's seat, or as a mud-guard. As illustrated the support 16 is pivotally held in a detachable socketed piece or bracket 25 secured by a set-screw or other means to the T-head of the seat-post. 26 indicates a set-screw or equivalent for fastening the foot of the support in a socket in said bracket to permit its lengthwise or rotary adjustment or its entire removal. As shown in full lines, the support is adapted as a back-support for fast riding. The approximately vertical dotted lines indicate an obvious adjustment for use as an ordinary back-rest. This bracket 25 has a horizontal socket 27 to receive the same or a like part 16 under two operative adjustments, as illustrated in Fig. 5, in which its position (shown in full lines) is suitable for a supplemental seat for a child or other person. The dotted lines in said figure show an adjustment of the part 16 as a mud-guard.

The particular means for attaching, adjusting, and fixing the support 16 may be varied. It is not essential that it be attached to the seat-post, nor that it be rigidly held to any part of the machine, and the spring and clutch connecting such, as elsewhere herein set forth, are not excluded by the particular improvement last described. Obviously the part 16 can be covered or cushioned in any usual manner. In some cases it will be provided with a flexible wrap that can be utilized when desired to bind a bundle on or under the support suitably adjusted, as illustrated in Fig. 5.

In Figs. 6 and 7 the back-support is shown adjustably held in a bracket 25' fixed directly to the seat, the horizontal socket being adapted to receive a set-screw when the part 16 is arranged as a back-support, as in racing or the like, and the vertical socket to receive the same under approximately horizontal arrangements of said part 16.

In Figs. 8 and 9 is shown a back-support having a metal stem 28, a metal band 29, and a wooden body 30 secured by rivets 31. Fig. 10 shows such a back-support secured in a rotatable block 25''. Each member of the band 29 is provided with a set-screw 32, entering a seat 33 in the block 25''. (See Fig. 11.) In said latter figure 34 denotes a hole in the block to receive one end of the T-head of seat-post 4. The block is secured to the T-head by screws 35. Other securing devices may be substituted in whole or in part for the set-screws indicated.

I am aware that hinged back-rests for bicycle-seats have been proposed, and such device is not broadly of my invention, though the use of a hinge connection between the back-support post and the seat, seat-post, or bicycle-frame is not inconsistent with my improvement.

The leverage of the knee-joint when the limbs are nearly straightened is very great and far exceeds that required to lift the body.

My improvement mainly consists in the construction whereby the rider is enabled to apply to the pedals more force than is possible without a counteracting device to limit this body-lifting effect of his limbs. This is especially true in case the body of the rider is inclined greatly forward and much of his weight thrown upon the handle-bar. In such a position a boy or man of light weight can by the use of the present invention easily exert double the force on the pedals possible in the prior construction, in which the only reacting force is his own weight on the seat.

I am also aware that a back-support having its face or bearing-surface situated in a plane above a seat is not new, and that back-rests have been made vertically adjustable and also adjustable in a plane passing through the front and rear of the seat and normally intended to bear upon the back in the lumbar region, and that various means have been proposed for holding a rider on the seat, but in no prior combined seat and back-rest has a fixed back-support been provided with its face in a plane inclined to the seat at an angle of less than forty-five degrees and thereby directly opposed to the pedals, said support having its face adapted to bear on the sacral region of the back.

My improvement is further characterized by the feature of construction whereby the back-support is adapted to be turned out of the way by the leg of a dismounting rider and by other particulars hereinafter pointed out.

Having thus fully described my invention, what I claim is—

1. In a velocipede the rigid stop or support overhanging the seat in a position forwardly inclined over the same and situated near said seat to bear downwardly on the sacral region of the back in line toward the pedals when the latter are moved downwardly, in combination with the pedals and with the seat, whereby the leg-thrust tends to push the back against the under side of the stop, substantially as described.

2. In a velocipede the stop or support overhanging the seat, in combination with a supporting-post adjustable to either hold the back-support forwardly and upwardly inclined over the seat with its bearing-face directly opposed to the pedal for racing or the like or to hold it in an upright position for ordinary use, substantially as described.

3. The combination of a velocipede seat, a back stop or support pivoted on a horizontal axis extending backwardly in a plane passing through the seat from front to rear, a friction-clutch holding the back-stop on the axis in a yielding manner, said stop being thereby adapted to be moved sidewise out of the way by the leg of the dismounting rider, substantially as described.

In testimony whereof I have signed this specification in the presence of two subscribing witnesses.

WILLIAM EDGAR PRALL.

Witnesses:
A. LANSING BAIRD,
DAVID C. GRANT.